United States Patent [19]

Flackett et al.

[11] Patent Number: 4,546,017

[45] Date of Patent: Oct. 8, 1985

[54] ORGANOPOLYSILOXANE COMPOSITION CURABLE TO AN ELASTOMER AND USE THEREOF

[75] Inventors: Dale R. Flackett, Wiesbaden; Reinhard Jonas, Edstein, both, Fed. Rep. of Germany; Brian R. Trego, Bossem, Belgium

[73] Assignees: Dow Corning Limted, London, England; Perennatorwerk Alfred Hagen GmbH, Wiesbaden, Fed. Rep. of Germany

[21] Appl. No.: 690,922

[22] Filed: Jan. 11, 1985

[30] Foreign Application Priority Data

Jan. 14, 1984 [GB] United Kingdom ............... 8401016

[51] Int. Cl.⁴ .............................................. B05D 3/02
[52] U.S. Cl. .................................... 427/387; 528/17; 528/34; 528/901
[58] Field of Search ........................ 528/17, 901, 34; 427/387

[56] References Cited

FOREIGN PATENT DOCUMENTS

| | | |
|---|---|---|
| 862576 | 3/1961 | United Kingdom . |
| 905364 | 9/1962 | United Kingdom . |
| 920020 | 3/1963 | United Kingdom . |
| 962061 | 6/1964 | United Kingdom . |
| 975603 | 11/1964 | United Kingdom . |
| 1035492 | 7/1966 | United Kingdom . |
| 1071311 | 6/1967 | United Kingdom . |
| 1255587 | 12/1971 | United Kingdom . |
| 1468467 | 3/1977 | United Kingdom . |
| 2002405 | 2/1979 | United Kingdom . |

*Primary Examiner*—Melvyn I. Marquis
*Attorney, Agent, or Firm*—Roger H. Borrousch

[57] ABSTRACT

A composition curable to an elastomer in the presence of moisture obtained by mixing (A) a polydiorganosiloxane having terminal silicon-bonded hydroxyl groups; (B) a defined complex of titanium; and (C) an oxime silane crosslinking agent. The compositions may also contain conventional ingredients such as fillers, curing catalysts and polydimethylsiloxanes having terminal triorganosiloxy groups.

The compositions are particularly suitable for use as low modulus sealants in building and glazing structures.

11 Claims, No Drawings

ORGANOPOLYSILOXANE COMPOSITION CURABLE TO AN ELASTOMER AND USE THEREOF

BACKGROUND OF THE INVENTION

1. Field of the Invention

This invention relates to organopolysiloxane compositions which are curable to elastomers and also relates to the use of such elastomers as sealants.

2. Background Information

Organopolysiloxane compositions which cure to elastomeric solids on exposure to water are well-known. Such compositions have found wide application as sealing materials for a variety of structures to which they may be applied and allowed to form elastomers merely by exposure to atmospheric moisture. Typically, such compositions comprise a polydiorganosiloxane and a crosslinking agent for the polydiorganosiloxane, for example, an alkoxy silane, an acetoxy silane, or an amino silane. In addition, the compositions may also contain one or more catalysts, fillers, pigments, adhesion promoters, and other ingredients. Examples of such curable compositions are those described in British Pat. Nos. 862,576; 905,364; 920,020; 962,061; 975,603; 1,035,492; and 1,071,311.

One important application of the above-described curable composition is their use as sealants in the building industry. For such applications, for example, in the fabrication and installation of glazed units, the cured elastomer should adhere strongly to both glass and the structure in which the glass is mounted. The elastomer should also have a relatively low modulus of elasticity which would permit it to adapt to the relative movement between the glazing and the structure due to the effects of temperature variation, wind, and other stresses. These requirements of adhesion and low modulus are sufficiently important that certain countries have established national standards relating to the use of sealants in glazing and building joint applications. For example, there exist in West Germany standards identified as DIN 18540 for building joints and DIN 18545 for glazing, which specify certain requirements as to adhesion and modulus of elasticity.

One type of curable composition which can be employed as a glass-bonding material is that based on a silanol-terminated polydiorganosiloxane and an oxime silane crosslinking agent, see for example British Pat. No. 1,468,467, Example 3. Such compositions have good curing characteristics in that they cure at an acceptable rate and do not produce corrosive substances during the curing process. However, they provide elastomers of relatively high modulus and having generally poor adhesion to glass and other substrates found in the building industry. We have not discovered that the modulus of such elastomers can be reduced and the adhesion thereof to, e.g. glass improved if there is incorporated into the elastomer-forming compositions certain complexes of titanium.

British Pat. No. 1,255,587 discloses compositions which are curable to elastomers on exposure to water and which comprise a diorganopolysiloxane possessing a silicon-bonded hydroxyl group in each of the terminal units and an organosiloxane having three monovalent hydrocarbon radicals, optionally-substituted, attached to one silicon atom and three groups Y attached to the other, Y being for example acyloxy, amino, aminoxy, aminoalkoxy, or oxime. The compositions may contain, as an optional ingredient, condensation catalysts for instance dibutyltin dilaurate and organosiloxy titanium compounds.

British Patent Application No. 2,002,405, published Feb. 21, 1979, discloses compositions curable to elastomers at room temperature and which contain inter alia, an organopolysiloxane having terminal silicon-bonded hydroxyl or hydrolyzable groups and a silicone-containing crosslinker having at least three hydrolyzable groups, e.g. alkoxy groups, acetoxy groups, amino groups, and ketoxime groups. The compositions optionally contain a curing catalyst examples of which are the metal salts of carboxylic acids, certain titanium compounds, amines, and amine salts. It is stated in the said application that the catalyst varies according to the hydrolyzable groups present. Example 1 discloses the use of a metal (tin) carboxylate as catalyst in compositions containing an alkoxy silane crosslinker. In Example 3, a composition crosslinked by way of an alkoxy silane contains a titanium chelate, as catalyst. There is no disclosure of a composition comprising a silanol-terminated polydiorganosiloxane, an oxime silane crosslinking agent and a titanium chelate. Example 2 of British Patent Application No. 2,002,405 relates to a composition containing an oxime silane but no catalyst is employed therein.

SUMMARY OF THE INVENTION

According to the present invention, there is provided a composition curable to an elastomer in the presence of moisture and comprising the product obtained by mixing (A) 100 parts by weight of a polydiorganosiloxane having terminal silicon-bonded hydroxyl groups and wherein at least 50 percent of the total organic substituents are methyl, (B) from 2 to 20 parts by weight of a complex of titanium represented by the general formula

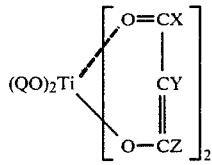

wherein each Q is a group having from 2 to 6 carbon atoms per group which is selected from hydrocarbon groups and groups composed of carbon, hydrogen, and oxygen in the form of ether linkages, each X and Z is an alkyl group having from 1 to 4 inclusive carbon atoms per group, and each Y is a hydrogen atom or an alkyl group having from 1 to 4 inclusive carbon atoms per group, and (C) from 3.3 to 33.3 parts by weight of one or more oxime silanes of the general formula

wherein each R is a monovalent group selected from alkyl groups having less than 6 carbon atoms, vinyl, allyl, and phenyl, each R' is a monovalent group selected from alkyl groups having from 1 to 6 inclusive carbon atoms and phenyl, and n has an average value of from 2.1 to 3.

Also included within the scope of this invention is the cured elastomeric product of the said compositions and the use of such compositions for sealing joints, cavities, and other spaces.

DETAILED DESCRIPTION OF THE INVENTION

In the polydiorganosiloxanes (A) the organic substituents are selected from lower aliphatic hydrocarbon groups, e.g. methyl, ethyl, propyl, or vinyl; phenyl; and fluorinated hydrocarbon groups, e.g. 3.3.3-trifluoropropyl. At least 50 percent of the total organic substituents should be methyl, the preferred polydiorganosiloxanes being those wherein substantially all of the organic substituents are methyl. The viscosity of the polydiorganosiloxane employed is not critical but preferably lies within the range from 500 to 200,000 mPa.s at 25° C. Most preferred are the polydimethylsiloxanes having a viscosity within the range from 1,000 to 75,000 mPa.s at 25° C. Polydiorganosiloxanes (A) are well-known substances. They are widely employed in the production of moisture-curable silicone compositions and can be represented by the general formula

HO-SiR"$_2$(OSiR"$_2$)$_x$OH wherein each R" represents an organic substituent, e.g. methyl, and x is an integer, preferably having an average value of from about 150 to about 1500.

The titanium complexes employed as component (B) of the compositions of this invention are titanium chelates represented by the general formula

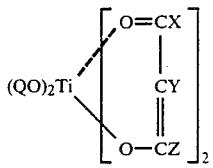

wherein each Q represents a group having from 2 to 6 carbon atoms and selected from hydrocarbon groups and groups composed of carbon, hydrogen, and oxygen in the form of ether linkages, X and Z each represent an alkyl group having from 1 to 4 inclusive carbon atoms and Y represents a hydrogen atom or an alkyl group having from 1 to 4 carbon atoms. In the general formula, Q may be, for example, ethyl, isopropyl, n-butyl, pentyl, methoxyethyl, methoxypropyl, or CH$_3$OC$_2$H$_4$OC$_2$H$_4$-. Preferably Q is butyl or pentyl, X and Z are each methyl and Y is hydrogen. The most preferred complex for use in the compositions is di-butoxytitanium-bis(acetylacetonate).

The titanium complexes (B) are, in general, known substances and a number of them are commercially available. They may be prepared, for example, by reacting an alcoholate of titanium, derived from, e.g. ethanol, butanol, diethylene glycol monomethyl ether, or phenol, with a diketone, e.g. acetylacetone.

At least 2 and up to 20 parts by weight of the complex (B) can be employed. When less than 2 parts (B) are employed, reduced adhesion of the cured elastomer to certain substrates can occur. More than 20 parts by weight of (B) can result in an undesirably soft elastomer and extended curing time. In general, it is preferred to employ from about 5 to about 12 parts by weight of the titanium complex.

In the general formula of the oxime silanes (C), the substituents R may be, for example, methyl, ethyl, propyl, vinyl, allyl, or phenyl and R' may be an alkyl group as exemplified for R or phenyl. The preferred oxime silanes are those wherein R represents methyl, ethyl, or vinyl, each R' represents methyl or ethyl and n is 3. Examples of the operative silanes (C) are methyl tris(methylethylketoxime)silane, vinyl tris(methylethylketoxime)silane, methyl tris(diethylketoxime)silane, and phenyl tris(methylethylketoxime)silane. From 3.3 to 33.3 parts by weight of the oxime silane are employed, the preferred level of addition for general application being from about 5 to about 18 parts by weight.

The compositions of this invention can be prepared by mixing (A), (B), and (C) in any order and employing any suitable mixing equipment. However, where reduced modulus is the prime consideration, it is desirable that at least a portion of the complex (B) be mixed with the polydiorganosiloxane (A) prior to the addition of the oxime silane (C). Such a method of operation is particularly preferred if an active condensation catalyst, e.g. a tin carboxylate is present in the mixture.

The compositions of this invention may contain as optional constituents other ingredients which are conventional to the formulation of silicone rubber sealants and the like. For example, the compositions will normally contain one or more reinforcing and/or extending fillers such as high surface area fume and precipitated silicas, crushed quartz, diatomaceous earths, calcium carbonate, barium sulphate, iron oxide, titanium dioxide, and carbon black. The proportion of such fillers employed will depend on the properties desired in the elastomer-forming composition and the cured elastomer. Usually the filler content of the compositions will reside within the range from about 5 to about 150 parts by weight per 100 parts by weight of polydiorganosiloxane (A).

Other ingredients which may be included in the compositions are catalysts for increasing the rate of cure of the composition, pigments, agents (usually organosilicon compounds) for treating fillers, and additional adhesion improving substances. Suitable curing catalysts are well-known in the art and include the metal salts of carboxylic acids, for example, lead octoate, dibutyltin dilaurate, dibutyltin diacetate, stannous octoate, and dibutyltin diversatate. The catalyst may be employed in conventional amounts, i.e. from about 0.05 to 10 parts by weight per 100 parts of (A). Another conventional ingredient which can be employed as a plasticizer and to reduce further the modulus of the cured elastomer is a polydimethylsiloxane having terminal triorganosiloxy groups wherein the organic substituents are, e.g. methyl, vinyl or phenyl or combinations of these groups. Such polydimethylsiloxanes normally have a viscosity of from about 100 to about 100,000 mPa.s at 25° C. and can be employed in amounts up to about 80 parts per 100 parts of (A).

Any optional additional ingredients may be incorporated at any stage of the mixing operation. As hereinbefore indicated, however, it is generally preferred to add the curing catalyst after mixing together the complex (B) and the polydiorganosiloxane (A). After mixing, the compositions may be stored under substantially anhydrous conditions, for example, in sealed containers until required for use.

The compositions of this invention cure on exposure to atmospheric moisture and may be employed in a variety of applications, for example, as coating, caulking and encapsulating materials. They are, however, particularly suitable for sealing joints, cavities and other spaces in articles and structures which are subject to relative movement. They are thus particularly suitable as glazing sealants and for sealing building structures and the decks of ships.

The following Examples in which the parts are expressed by weight illustrate the invention.

EXAMPLE 1

A silanol-terminated polydimethylsiloxane having a viscosity at 25° C. of 50 Pa.s (45 parts) was thoroughly mixed with di(n-butoxy)titanium bis-acetylacetonate (complex) (4 parts of a 75% by weight solution in butanol). Into this mixture was then incorporated the oxime silane $CH_3Si[ON=C(CH_3)(C_2H_5)]_3$ (2.5 parts), dibutyltin dilaurate (0.5 part), a trimethylsiloxy-terminated polydimethylsiloxane having a viscosity of 1000 mPa.s at 25° C. (20 parts), calcium carbonate (18.5 parts) and fume silica (5.5 parts). The components were mixed in a Drais planetary mixer fitted with a vacuum port. Three additional compositions were then prepared in identical manner except that the proportions of oxime silane employed were respectively 4.5, 6.5, and 8.5 parts.

The freshly prepared compositions were poured into flat molds and exposed to the normal laboratory atmosphere (approximately 50% relative humidity and 22° C.) for one week. The physical properties of the cured samples were then measured using dumbbell-shaped test pieces (DIN Standard 2×4× approximately 40 mm) cut from the sheets, and a tensile test machine (FRANK Type 81560) and Shore A hardness test equipment. The results were as shown in Table I:

TABLE I

| Oxime Silane (Parts) | Hardness (Shore A) | Elongation at Break (%) | Force at Break N/cm² | Modulus of Elasticity N/cm² |
|---|---|---|---|---|
| 2.5 | 6 | 560 | 38 | 17 |
| 4.5 | 11 | 650 | 58 | 23 |
| 6.5 | 16 | 520 | 98.6 | 33.9 |
| 8.5 | 19 | 530 | 131.9 | 42.6 |

EXAMPLE 2

A series of compositions was prepared employing the method, ingredients and proportions described in Example 1 except that the amount of oxime silane was maintained constant at 4.5 parts and the proportion of the solution of titanium complex varied from 0 to 12 parts. The freshly-prepared samples were allowed to cure to elastomeric sheets as described in Example 1 and physical property measurements performed on dumbbell test pieces with the following results as shown in Table II:

TABLE II

| Complex Solution (Parts) | Hardness (Shore A) | Elongation at Break % | Force at 500% Elongation N/cm² | Modulus of Elasticity N/cm² |
|---|---|---|---|---|
| 0 | 18 | 650 | 135 | 41 |
| 2.0 | 16 | 600 | 117 | 35.25 |
| 2.5 | 14 | 660 | 98 | 32.8 |
| 3.0 | 12 | 725 | 75 | 27.3 |
| 3.5 | 11 | 810 | 64 | 24.7 |
| 4.0 | 11 | 650 | 58 | 23 |
| 8.0 | 12 | 445 | 51* | 23 |
| 12.0 | 10 | 355 | — | 19 |

*Force at break. Elongation <500%

It can be seen from the table that in the absence of the complex an elastomer is obtained having an undesirably high modulus of elasticity for sealant applications. The composition having 12 parts of complex solution (9 parts of complex) cures to an elastomer having little strength and which would thus be generally unsuitable for the majority of applications. Compositions containing about 3 to 4 parts of the complex solution cure to elastomers having a desirable combination of properties for sealant purposes, namely relatively low hardness, moderate modulus of elasticity, and large elongation at break.

EXAMPLE 3

This example illustrates the effect of a titanium complex on the adhesion of the elastomer to glass, aluminium, and polyvinyl chloride substrates.

An elastomer-forming composition was prepared according to the method and formulation of Example 1, the amount of oxime silane employed being 4.5 parts. For comparison, a second composition was similarly prepared except that the titanium complex was omitted.

A bead of each composition 12×12×50 mm was formed between two surfaces of each of the substrates to form sandwich-like H-pieces and the compositions allowed to cure under normal atmospheric conditions for one month. The parallel substrates in each H-piece were then pulled apart at a rate of 6 mm per second and the percentage elongation at which breakage occurred was noted. The results obtained are given in Table III and clearly show the effect of the titanium complex.

TABLE III

| Substrate | With Complex | Without Complex |
|---|---|---|
| Glass | >300% | 66% |
| Aluminum | >300% | 0%* |
| PVC | >300% | 0%* |

*No adhesion to substrate

EXAMPLE 4

An elastomer-forming composition was prepared as in Example 1 employing 4.5 parts of the oxime silane and the dibutyltin dilaurate being omitted. The composition cured to a low modulus elastomer when exposed to the normal laboratory atmosphere.

That which is claimed is:

1. A composition curable to an elastomer in the presence of moisture and comprising the product obtained by mixing
   (A) 100 parts by weight of a polydiorganosiloxane having terminal silicon-bonded hydroxyl groups and wherein at least 50 percent of the total organic substituents are methyl,
   (B) from 2 to 20 parts by weight of a complex of titanium represented by the general formula

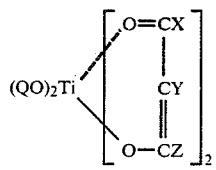

wherein each Q is a group having from 2 to 6 carbon atoms per group which is selected from hydrocarbon groups and groups composed of carbon, hydrogen, and oxygen in the form of ether linkages, each X and Z is an alkyl group having from 1 to 4 inclusive carbon atoms per group, and each Y is a hydrogen atom or an alkyl group having from 1 to 4 inclusive carbon atoms per group, and (C) from 3.3 to 33.3 parts by weight of one or more oxime silanes of the general formula $$R_{4-n}Si(ON=CR'_2)_n$$

wherein each R is a monovalent group selected from alkyl groups having less than 6 carbon atoms, vinyl, allyl, and phenyl, each R' is a monovalent group selected from alkyl groups having from 1 to 6 inclusive carbon atoms and phenyl, and n has an average value of from 2.1 to 3.

2. The composition as claimed in claim 1 wherein the complex (B) is dibutoxy titanium bis-acetylacetonate.

3. The composition as claimed in claim 1 which also contains a metal carboxylate catalyst.

4. The composition as claimed in claim 1 which also contains a filler.

5. The composition as claimed in claim 2 which also contains a filler.

6. The composition as claimed in claim 4 which also contains a polydimethylsiloxane having terminal triorganosiloxy groups.

7. The composition as claimed in claim 5 which also contains a polydimethylsiloxane having terminal triorganosiloxy groups.

8. The composition as claimed in claim 1 wherein (A) is mixed with at least a part of (B) prior to the incorporation of (C) into the mixture.

9. The composition as claimed in claim 6 wherein (A) is mixed with at least a part of (B) prior to the incorporation of (C) into the mixture.

10. The elastomeric product of curing a composition as claimed in claim 1.

11. A method of sealing a joint, cavity or other space in a structure or article which comprises applying thereto a composition as claimed in claim 1 and thereafter exposing the applied composition to moisture.

* * * * *